(12) United States Patent
Xiao et al.

(10) Patent No.: US 10,322,405 B2
(45) Date of Patent: Jun. 18, 2019

(54) HIGHLY DISPERSED METAL CATALYST AND RELATED METHODS

(71) Applicant: SAVANNAH RIVER NUCLEAR SOLUTIONS, LLC, Aiken, SC (US)

(72) Inventors: Xin Xiao, Augusta, GA (US); William D. Rhodes, Manassas, VA (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 0 days.

(21) Appl. No.: 15/296,135

(22) Filed: Oct. 18, 2016

(65) Prior Publication Data

US 2017/0036193 A1    Feb. 9, 2017

Related U.S. Application Data

(62) Division of application No. 12/803,698, filed on Jul. 2, 2010, now Pat. No. 9,486,786.

(51) Int. Cl.

| | |
|---|---|
| *B01J 23/62* | (2006.01) |
| *B01J 23/42* | (2006.01) |
| *B01J 21/18* | (2006.01) |
| *B01J 23/89* | (2006.01) |
| *B01J 35/00* | (2006.01) |
| *B01J 35/02* | (2006.01) |
| *B01J 37/02* | (2006.01) |
| *H01M 4/92* | (2006.01) |
| *B01J 21/04* | (2006.01) |
| *B01J 35/10* | (2006.01) |
| *B01J 37/08* | (2006.01) |
| *H01M 4/88* | (2006.01) |

(52) U.S. Cl.
CPC .......... *B01J 23/626* (2013.01); *B01J 21/04* (2013.01); *B01J 21/18* (2013.01); *B01J 23/42* (2013.01); *B01J 23/8913* (2013.01); *B01J 35/0006* (2013.01); *B01J 35/0013* (2013.01); *B01J 35/023* (2013.01); *B01J 35/1019* (2013.01); *B01J 35/1023* (2013.01); *B01J 35/1028* (2013.01); *B01J 37/0201* (2013.01); *B01J 37/0215* (2013.01); *B01J 37/0236* (2013.01); *B01J 37/088* (2013.01); *H01M 4/885* (2013.01); *H01M 4/8882* (2013.01); *H01M 4/92* (2013.01); *H01M 4/921* (2013.01); *H01M 4/925* (2013.01); *H01M 4/926* (2013.01); *B01J 23/62* (2013.01); *Y02E 60/50* (2013.01)

(58) Field of Classification Search
CPC ........ B01J 23/62; B01J 23/42; B01J 35/1019; B01J 35/1023; B01J 35/1028; B01J 37/0201; B01J 37/2015; B01J 37/0236; B01J 37/088; B01J 23/626; B01J 21/04; B01J 21/18; B01J 23/8913; B01J 35/0006; B01J 35/0013; B01J 35/023; H01M 4/926; H01M 4/885; H01M 4/8882; H01M 4/92; H01M 4/921; H01M 4/925

USPC ................................................. 502/326, 339
See application file for complete search history.

(56) References Cited

U.S. PATENT DOCUMENTS

| | | | |
|---|---|---|---|
| 4,431,574 A | 2/1984 | Bournoville et al. | |
| 5,849,657 A * | 12/1998 | Rotgerink ................ | B01J 23/60 502/223 |
| 6,218,334 B1 * | 4/2001 | Alario ...................... | B01J 23/56 502/226 |
| 7,863,489 B2 * | 1/2011 | Johnston .................. | B01J 21/08 568/885 |
| 2006/0166809 A1 | 7/2006 | Malek et al. | |
| 2007/0053252 A1 | 2/2007 | Reid et al. | |
| 2007/0105716 A1 * | 5/2007 | Kang ...................... | B01J 23/42 502/330 |

OTHER PUBLICATIONS

J. Zang, et al.; Platinum Monolayer on Nonnoble Metal-Noble Metal Core-Shell Nanoparticle Electrocatalysts for O Reduction. The Journal of Physical Chemistry B; 2005, 109 (48), 22701-22704, downloaded from hyyp://pubd.scd.org on Jan. 28, 2009.

A. Kowal, et al.; Ternary Pt/RH/SnO2 electrocatalysts for oxidizing ethanol to CO2; Nature Materials; (www.nature.com/naturematerials; Letters published online Jan. 25, 2009; DOI:10.1038/NMAT2359, pp. 1-6.

A. Kowal, et al.; Ternary Pt/RH/SnO2 electrocatalysts for oxidizing ethanol to CO2; Nature Materials; (www.nature.com/naturematerials; (Supplementary information correction) Letters published online Jan. 29, 2009; DOI:10.1038/NMAT2359, pp. 1-6.

J. Zang, et al.; Platinum Monolayer Electrocatalysts for O Preduction: Pt Monolayer on Pd(111) and on Carobon-Supported Pd Nanoparticles; The Journal of Physical Chemistry B; 2004, 108 (30), 10955-10964, downloaded from hyyp://pubd.scd.org on Jan. 28, 2009.

Kimihisa Yamamoto, et al.;Size-specific catalytic activity of platinum clusters enchances oxygen reduction reactions; Nature Materials; (www.nature.com/naturematerials; Letters published online Jul. 20, 2009; DOI:10.1038/NCHEM.288, pp. 397-402.

Li et al., Surface difussion and the spillover of H-adatoms and oxygen-containing surface species on the surface of carbon black and Pt/C porous electrodes, 1999, Journal of Electroanalytical Chemistry, 476, 101-108.

* cited by examiner

*Primary Examiner* — James A Fiorito

(74) *Attorney, Agent, or Firm* — J. Bennett Mullinax, LLC

(57) ABSTRACT

Supported catalysts having an atomic level single atom structure are provided such that substantially all the catalyst is available for catalytic function. Processes of forming a catalyst unto a porous catalyst support is also provided.

10 Claims, 2 Drawing Sheets

HIGHLY DISPERSED METAL CATALYST AND RELATED METHODS

RELATED APPLICATIONS

This application is a divisional application of U.S. patent application Ser. No. 12/803,698 filed on Jul. 2, 2010, and which is incorporated herein by reference in its entirety.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a process and the resulting material of forming an atomic level single atom structure on a relatively large surface area in a porous catalyst support such that all of the catalyst is available without any inefficiency which may result from catalyst stacking or crystallite formation.

BACKGROUND OF THE INVENTION

Traditional catalyst formation and development typically uses an active metal component in which incremental loading of the metal component is conducted and evaluated so as to obtain desired activity. However, a typical metal loading levels frequently result in an over application of metal since metal atoms are frequently stacked on top of each other or agglomerated and thereby precludes a portion of the atoms from reacting with otherwise available reactive molecules. Given the structure and high cost for numerous precious metal catalysts, the cost of typical catalyst structures are higher than necessary since the catalyst deposition procedures result in catalyst structures in which not every catalyst atom is capable of interaction. Accordingly, there remains room for a variation and improvements within the art.

SUMMARY OF THE INVENTION

It is one aspect of at least one of the present embodiments to provide for a process and a resulting catalyst in which the catalyst is present in a substrate as a single atom structure such that substantially every atom is available for catalytic activity. In a small crystal particle, corner atoms are usually more active than edge ones, which in turn are more active than surface atoms for catalytic reactions. Effective dispersion, or reduction of particle size, increases the ratio of corner vs. surface atoms. Additional activity are thus obtained through dispersion beyond the availability of metal atoms.

It is a further aspect of at least one of the present embodiments to provide for a method to determine catalyst metal dispersion using selective probe molecules to indicate the number of accessible metal atoms.

It is a further aspect of at least one of the present embodiments of the invention to provide a dispersion process for a catalyst on a porous substrate such that the resulting catalyst and substrate exhibit catalytic activity up to three orders of magnitude more active than prior art catalyst formation techniques.

It is a further object of at least one of present embodiments to provide for a process of loading a Pt catalyst from a solution in which the solution contains an atom or molecule having an opposite charge from Pt precursor to prevent Pt agglomeration during the impregnation of the porous catalyst support with the Pt catalyst.

It is yet another aspect of at least one of the present embodiments of the invention to provide for a process to disperse a catalyst onto a catalyst support such that the dispersed catalyst is present as a single atomic structure comprising the steps of:

preparing a solution containing a catalyst and a promoter, promoter present in an amount substantially equivalent to the catalyst and having an opposite charge;

adjusting the pH of the resulting catalyst and promoter solution in accordance with the surface properties of the porous catalyst support material;

immersing the porous material in the solution;

removing the porous material from the solution;

drying the porous solution under conditions that prevents capillary effect transfer from an interior of the support to an exterior of the support;

performing a catalyst calcination step under elevated temperatures of between 450° and 700° C. and in the presence of an inert gas;

reducing the catalyst under elevated temperatures and in the presence of a reducing agent such as hydrogen.

Thereafter, dispersion of the catalyst can be measured using a hydrogen-oxygen titration methodology.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in the following detailed description.

It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

In accordance with this invention, it has been found that a metal catalyst can be applied to a porous support such as to form a single atomic dispersion. For example, single atomic dispersion of the metal catalyst can be at least about 50%, and preferably at least about 90% on the surface of the catalyst on the catalyst support. By increasing the dispersion from prior art nano particle sizes to the single atomic structure set forth in the present invention, it has been found possible to increase catalyst activity by 1 to 2 magnitudes of order. Accordingly, by improving catalyst dispersion for electrochemical reactions, greater electric current density and more economical use of the catalyst can be achieved. Alternatively, it is also possible to reduce the catalyst loading by the same factor so as to maintain standard functionality using a lower cost but more highly efficient catalyst.

Figure 1:
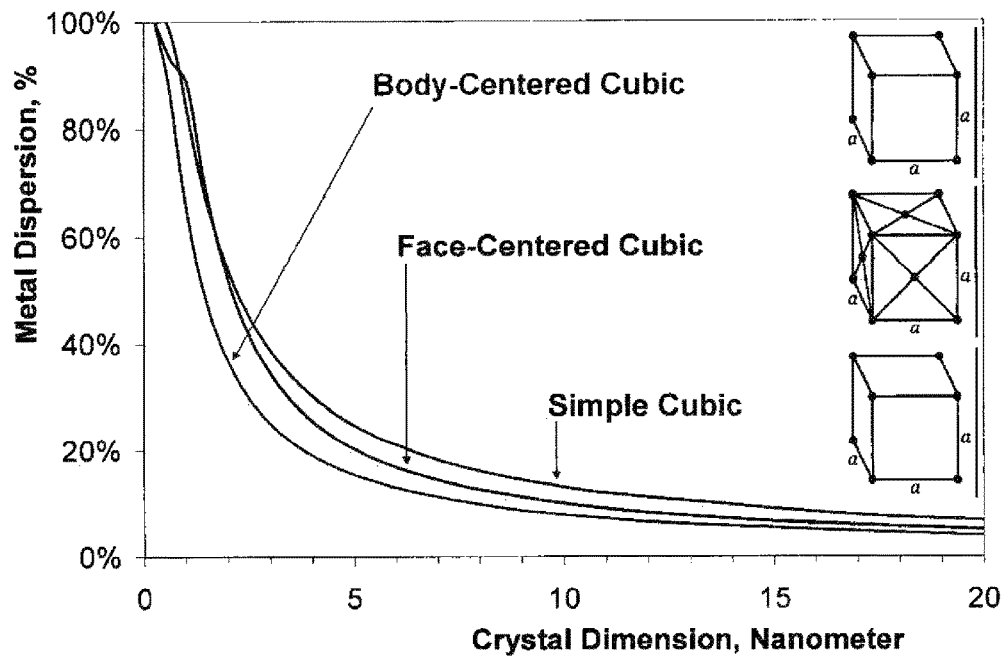
FIG. 1 is a graph showing metal dispersion as a function of particle size.

Set forth in FIG. 1, the graph illustrating that ability to disperse metals increases exponentially upon decreasing the dimension of the sub-nano particle. It has been found in accordance with this invention that by dispersing catalyst from a nano particle to atomic dispersion achieves benefits in efficiency and catalyst cost reduction can be achieved.

Metal dispersion is directly related to activity of metal sites on catalysts. Pt metal dispersion is reliably measured by chemisorption of oxygen, hydrogen or carbon monoxide as well as hydrogen-oxygen titration. The results are expressed as the ratio of the number of moles of adsorptive chemisorbed to the number of moles of Pt in the catalyst. A value of 1.00 is defined as 100% dispersion (all the Pt atoms are available for catalysis). Values less than 100% may indicate crystallite growth or a surface interference.

The chemisorption protocol used herein utilizes selected probe molecules to indicate the number of accessible metal atoms for determining catalyst dispersion. The chemisorption process is different from electron microscopic or X-ray diffraction techniques since such techniques require the existence of small crystals or nano particles. It has been found in the course of this invention that with highly dispersed metal catalysts, chemical adsorption methodology is superior in determining the availability of catalysts sites for catalytic activity. The principles surrounding the chemisorption process is described in reference to Paul A. Webb and Clyde Orr, "Analytical Methods in Fine Particle Technology", Micromeritics Instrument Corporation, ISBN 096567830X, (1997), pp 227, which is incorporated herein by reference.

Figure 2:
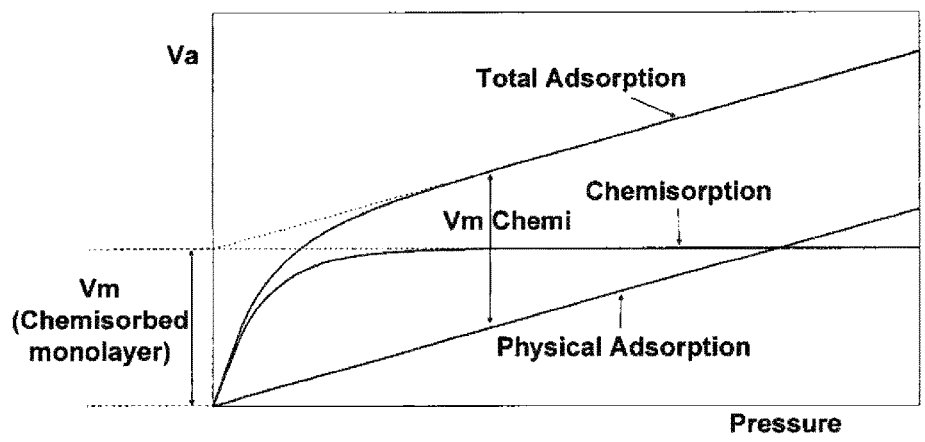
FIG. 2 is a graph illustrating principle and methodology to determine the availability of active sites for catalysis.

As seen FIG. 2, the isotherm of total adsorption, including both chemical and physical adsorptions, is first determined. Physically adsorbed molecules are then removed by evacuation or purging with inert gas. The subsequent measurement is the pure physical adsorption. The difference between total adsorption and physisorption is the chemisorption uptake which indicates the number of accessible metal atoms. The molar ratio of the accessible metal to the total metal content is the metal dispersion. The stoichiometry factor for platinum dispersion has been studied repeatedly during the past decades. However, there is no universally accepted technique to measure the exposed platinum area. It is generally accepted that $H/Pt=1$ and $O/Pt=1$, within about 20% deviation. Different authors reported different values depends on techniques used, but all are in vicinity of unit, e.g., $H/Pt=1.10$ and $O/Pt=0.71$. Detailed procedures and apparatus, for a volumetric vacuum method can be found in reference to ASTM D 3908-88 (1993) which is incorporated herein by reference. Specifically, the $H_2$—$O_2$ titration methodologies were used with the current examples for Pt dispersion due to the fact that reaction of hydrogen and oxygen is strictly stoichiometric and no arbitrary stoichiometry factor is needed. Examples of the $H_2$—$O_2$ titration method using flow kinetic measurement are known in the art. The hydrogen-oxygen reaction was found useful with respect to overall stoichiometry and catalytic activity data. The measurement of the quantity of probe molecules interacting with catalyst surface metals can be determined by volumetric, gravimetric, calorimetric, flow technique or carrier gas methods. Details of each method are described in reference to James B. Condon, "Surface Area and Porosity Determinations by Physisorption: Measurements and Theory", Elsevier Science, ISBN 978-0444519641, (2006), pp 29-53, which is incorporated herein by reference. Though the $H_2$—$O_2$ reaction is stoichiometric, the surface adsorption can be apart from unity stoichiometric results. The result less than unity is due to weak adsorption, while higher than unity result is also possible due to spillover effects. The unit stoichiometry used in this invention is fine-tuned by combination of strong oxygen adsorption on Pt, hydrogen-oxygen reaction to form water, and then subtract weak chemical and physical adsorption portion from hydrogen.

The examples set forth below describe a process and a catalyst loading for Pt. However, the choice of an active metal catalyst using this concept and process can involve any transition metal or noble metal in the periodic table groups VIII, groups IIIB-VIIB and groups IB-2B. Pt/C, PtCo/C and PtSn/C catalysts were prepared as follows on a Darco activated carbon substrate followed by drying and calcination. Initially, it was expected that low metal loadings would achieve a higher dispersion since it is known that metals tend to agglomerate on surfaces as the available surface becomes occupied by metal. However, it is set forth in FIG. 3, that low Pt loading samples only had a dispersion of Pt in the 7-30% range. It was surprisingly noted that Pt dispersion increased as Pt loading increased. Both Pt/C and PtCo/C reached about 40% dispersion with an average particle size of 2.5 nanometer at Pt loadings of 2-4 wt %.

It is possible to achieve greater than 90% Pt dispersion with a PtSn/C catalyst with a 1.1 to 1.5 wt % Pt loading. It is believed that the presence of Sn helps to maintain the Pt evenly dispersed on the activated carbon support. Using Sn as a promoter molecule is found to be a useful element in maintaining the Pt dispersion. It is found that Co also works as a promoter metal though with a lower efficiency than Sn.

The catalysts were prepared using an incipient wetness impregnation method. The general protocol involves taking the active metal precursor (M) which is dissolved in aqueous or organic solution. The metal-containing solution is added to a catalyst support "S". The catalyst support can be porous and can be selected from the group consisting of activated carbon, alumina, silica, silica-alumina, or molecular sieves. Through capillary action, the metal-containing solution is drawn into the pores wherein the catalyst may be dried and calcined to decompose "M" and to drive off volatile components. The catalyst is then subsequently reduced to convert metal oxide to elemental metal at the active sites. The end result is the metal deposited on the catalyst surface.

Example 1

A Darco activated carbon from Aldrich (surface area, 681 m²/g) is dried overnight to 110° C. to remove adsorbed moisture. A 1.0 gram sample of the dried activated carbon is used to determine void volume by filling with dionized water. A void volume was calculated as 1.83 mL/gram. A 40.0 mL aqueous solution containing 1.4681 grams of $H_2PtCl_6.6H_2O$ and 0.6335 grams of $SnCl_2.2H_2O$ was prepared with HCl acid being added as needed to dissolve the salts. 5.5 mL of the dissolved salt solution was diluted with de-ionized water to 13.7 mL. The diluted 13.7 mL solution was added to 5.0012 grams of the dried activated carbon. The activated carbon in the excess solution is removed by vacuum filtration. The solution uptake is recorded at 8.9 mL. The activated carbon is stirred and allowed to dry at least overnight at ambient conditions. It was found that drying must be very slow in order to maintain uniform dispersion of the desired metals within the activated carbon substrate. Once the activated carbon particles are dry, additional drying occurs overnight at 110° C. The respective samples are then calcined at about 600° C. for two hours in a tubular furnace with an inert gas blanket. Following cooling, the sample weight is recorded. The actual metal content of the final catalyst is calculated at 1.5 wt % Pt and 0.9 wt % Sn, respectively. The catalyst sample is reduced in situ by hydrogen flow at 550-600° C. cool down to ambient, and its Pt dispersion is measured at 90.1%.

Figure 3:
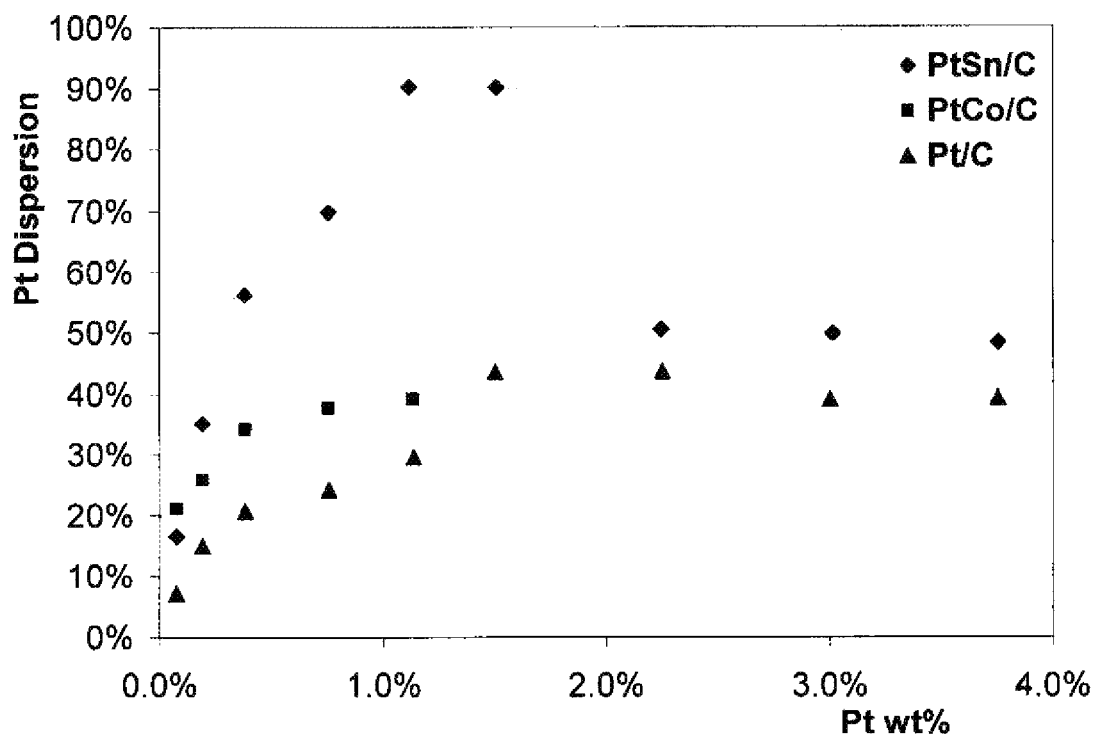
FIG. 3 is a graph illustrating the effect of Pt loading and promoter for Pt dispersion.

The data indicates excellent Pt dispersion and catalytic activity based upon water formation from $H_2$ and $O_2$. Further, the Pt loading of the sample at 1.5% Pt was equivalent to 0.0221 mg Pt/m² surface area, in which Pt atoms occupies only about 0.4% catalyst surface area and which exceeds commercially platinum reforming catalyst loadings of about 0.0125 mg Pt/m². Various Pt loadings with respective Pt dispersions are shown in FIG. 3, following similar preparation procedures.

Example 2

Figure 4:
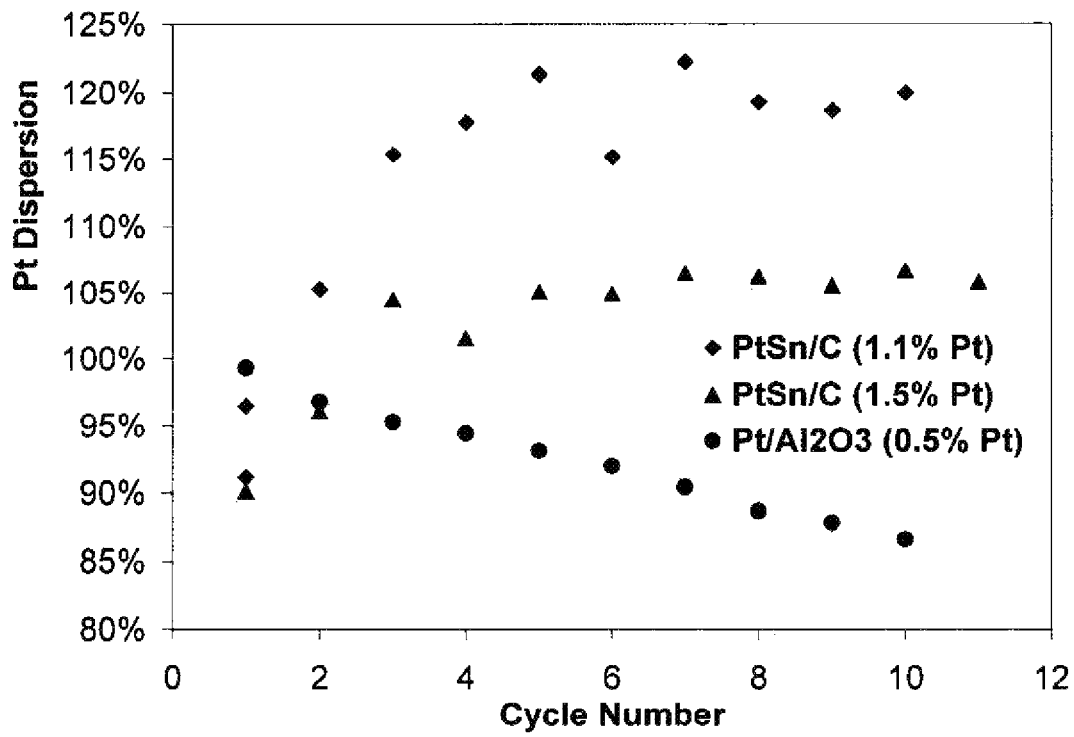
FIG. 4 is a graph illustrating Pt dispersion data and catalyst activity following multiple temperature cycles from ambient to 500-700° C. then ambient.

The stability of the catalyst is also determined by cycling the resulting supported catalyst between ambient conditions and temperatures of 500-700° C. Following the cycles, and as set forth in FIG. 4, the catalyst activity actually increased following several cycles and stabilized at about 120% dispersion for the 1.1% Pt catalyst sample and about 106% dispersion for the 1.5% Pt catalyst sample evaluated. For comparison, the Pt dispersion of $Pt/Al_2O_3$ catalyst decreased moderately from 99.3 to 86.6% after 10 cycles.

Example 3

Dispersion higher than 100% is known as a spillover effect. The spillover effect is a known phenomenon where adsorbed single H or O atoms exist at high mobility states moving from a Pt site to the activated carbon surface. It has been reported that spillover hydrogen can migrate as far as 5 mm on catalyst support.

As set forth in Table 1, data from chemisorptions using oxygen and hydrogen on two catalysts of $Pt/Al_2O_3$ and Pt/Sn/C is set forth. The data reported is chemisorption uptake relative to the catalyst Pt content at molar ratio and the Pt dispersion is based on $H_2$—$O_2$ titration methods. Results indicated no oxygen spillover on the $Pt/Al_2O_3$ catalyst since the Pt dispersion and $O_2$ chemisorption uptake were essentially the same, while the $H_2$ chemisorption was weak. In comparison, the oxygen spillover on the Pt/Sn/C was significant. The $O_2$ chemisorption uptake was 235.1% of the total Pt, Indicating significant amounts of oxygen atoms were spilled over to the carbon surface. These oxygen atoms were stored on a carbon surface as if there were more Pt atoms available. When the catalyst had been exposed to $H_2$ molecules, some of the spilled-over oxygen atoms on the carbon surface can be back to Pt sites for reaction with $H_2$, resulting in a higher than 100% Pt dispersion being reported. As a result, the PtSn/C catalyst behaves in such a way to have greater activity than the availability of Pt because of the spillover effect. The catalyst activity due to spillover effect is an advantage. On the other hand, the $H_2$ adsorption over PtSn/C catalyst was weak. It is oxygen spillover, not hydrogen spillover, that causes some of the Pt dispersion measurements over 100% for PtSn/C catalysts.

Example 4

As set forth in Table 2, the effect of various activated carbon supports was evaluated for Pt dispersion of PtSn/C catalyst. Set forth in Table 2, the Pt dispersion data along with the surface area of the catalyst supports is provided. The Pt dispersion is compared on equal Pt wt % loading as well as Pt loadings proportional to surface areas of various activated carbons. It is believed that the techniques utilized herein provide for a perfect Pt loading that Pt single atoms occupy about 0.5% of the activated carbon supports' surface area, or 0.022 mg Pt/m² surface area for ORNL mesoporous carbon or Darco activated charcoal. Based on the data, it is believed that the Darco activated charcoal is preferred given its higher surface area.

Example 5

Set forth in Table 3, is a comparison of a PtSn/C and $Pt/Al_2O_3$ catalyst with commercial available catalysts as listed. Using the protocols and analytical techniques described herein, the commercially available catalysts, while having a high Pt loading, indicates a significant amount of the loaded Pt is unusable for catalyst activity due to poor Pt dispersion. It is believed that the Pt is very susceptible to agglomeration in that the wide range in catalyst particle sizes in the commercial catalyst may be attributable to the dispersion noted. As indicated in Table 3, proper preparation of PtSn/C and $Pt/Al_2O_3$ samples can achieve almost perfect dispersion values between 90% and 100%. Such ratios are significant improvements over that of commercially available industrial catalysts prepared using different techniques. Consequently, average particle size is significantly smaller with perfect Pt dispersion. The catalyst supports without Pt show little or no interaction with probe molecules based on the $H_2$—$O_2$ titration technique.

Example 6

Using the above protocols, catalyst samples were prepared ranging from 2 grams up to 150 grams each batch to establish the reproducibility of the process and results. The batch of 150 grams preparation with 1.459 wt % Pt and 0.885 wt % Sn was verified to have 96.5% Pt dispersion. The dispersion result is even better than that of 2.0-5.0 grams smaller batch preparations. It is possible to consistently achieve 90+/-10% Pt dispersion using the technique described above.

The present invention lends itself to improved catalyst for a variety of commercial activity. For instance, in the field of fuel cells electro-catalysts improvements can be achieved by increased catalytic efficiency and/or through the reduction in the amount of precious metals needed. Economic benefits include increasing the efficiency of the underlying technology as well as the use of lesser amounts of catalysts.

The improved catalyst structures described herein are also useful for developing improved sensors such as sensors for detecting combustible gases. For example, catalysts for detecting combustible gases will result in an exothermic oxidation reaction in which the resulting temperature change in the sensor is used to provide for safety warnings.

Additional applications for the process and resulting catalyst described herein are for rechargeable battery applications in which nano-structured electrodes are utilized. The improved electrodes would have the ability to increase electrical currents as well as to increase the number of charging and discharging cycles for the battery.

The catalysts also lend themselves well to use in petrochemical processing where catalytic controlled events such as hydrogenation, dehydrogenation, conversion of benzene and other aromatic compounds to various polymer and polymer precursors can be enhanced.

To the extent the existing catalysts are used with activities such as radioactive material confinement or process to purify the stream from tritium decay, the greater activity and lower cost are possible through use of the process and the resulting formed catalyst.

Thus according to the disclosure herein and in U.S. patent application Ser. No. 12/803,698 that is incorporated by reference herein, a catalyst can be provided that can be selected from a group consisting of transition metals, noble metals and metallic compounds containing at least one transition metal or noble metal which are present on a catalyst support whereas the metal catalyst is substantially in the form of a single atomic dispersion. The transition metals, noble metals and metallic compounds can be any transition metal or noble metal in the periodic table groups VIII, groups IIIB-VIIB and groups IB-2B. The single atomic dispersion of the catalyst can be at least about 50%, and preferably can be at least about 90% on the surface of the catalyst on the catalyst support. In particular, the single atom structure of catalyst can have a dispersion value of greater than 100% using a hydrogen-oxygen titration dispersion calculation.

Similarly, a process of forming a catalyst onto a substrate can be provided wherein the catalyst is present at essentially a single atom structure. The process can comprise the steps of preparing a solution comprising a catalyst and a promoter. The promoter can be present in an amount substantially equivalent to the catalyst and having an opposite charge. The process can include adjusting the pH of the resulting catalyst and promoter solution in accordance with the surface properties of the porous catalyst support material. Further, the process can comprise immersing the porous material in the solution and removing the porous material from the solution. The process can also include drying the porous solution under conditions that prevents capillary effect transfer from an interior of the support to an exterior of the support and performing a catalyst calcination step under elevated temperatures.

In some embodiments, the calcination step can be done in the presence of at least one of air, hydrogen, inert gas, or combination thereof. For example, the calcination step can be done in the presence of at least one of air, hydrogen, inert gas, or combination thereof at a temperature between 450° C. and 700° C. Further, in some embodiments, the catalyst support can be selected from the group consisting of activated carbon, alumina, silica, silica-alumina, or molecular sieves.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

TABLE 1

Spillover in Chemisorption

| | relative to total moles of Pt in catalyst | | |
|---|---|---|---|
| | Pt dispersion | $O_2$ chemi | $H_2$ chemi |
| Pt/$Al_2O_3$ (0.21% Pt) | 80.3% | 80.1% | 18.8% |
| PtSn/C (0.75% Pt) | 90.7% | 235.1% | 11.1% |

TABLE 2

PtSn/C with Various Activated Carbons

| Activated Carbon | Surface area, $m^2$/g | Pt % | mg Pt/$m^2$ | Dispersion % | Pt % | mg Pt/$m^2$ | Dispersion % |
|---|---|---|---|---|---|---|---|
| ORNL Mesoporous Carbon | 385 | 1.5 | 0.039 | 67.6 | 0.9 | 0.022 | 88.5 |
| Darco Activated Charcoal | 681 | 1.5 | 0.022 | 90.1 | 1.5 | 0.022 | 90.1 |
| TIMCAL ENSACO 350G | 760 | 1.5 | 0.019 | 49.6 | 1.6 | 0.022 | 46.2 |
| CABOT Black Pearls 2000 | 1400 | 1.7 | 0.012 | 36.2 | 3.8 | 0.027 | 20.0 |
| Akzo Nobel Ketjen Black EC-600JD | 1475 | 1.8 | 0.012 | 62.3 | 3.8 | 0.025 | 45.4 |

TABLE 3

Benchmark with Commercial Catalysts

| Catalysts | Pt Content | Pt dispersion (particle size) |
|---|---|---|
| Commercial Catalyst1 Pt/C | 39.7% | 6.2% (15 nm) |
| Commercial Catalyst2 Pt/C | 45.9% | 21.7% (4.5 nm) |
| Commercial Catalyst3 Pt/C | 1.0% | 47.3% (2.2 nm) |
| PtSn/C | 1.5% | 90.1% (0.65 nm) |

TABLE 3-continued

Benchmark with Commercial Catalysts

| Catalysts | Pt Content | Pt dispersion (particle size) |
|---|---|---|
| Pt/Al$_2$O$_3$ | 0.5% | 99.3% (0.27 nm) |
| Activated Carbon (blank) | — | −0.1% |
| Al$_2$O$_3$ (blank) | — | −0.3% |

That which is claimed:

1. A process of forming a catalytic metal onto a catalyst support, the process comprising the steps of:

preparing an aqueous solution comprising a promoter precursor having a promoter cation of Sn or Co and a catalytic metal precursor comprising H$_2$PtCl$_6$ comprising a catalytic metal of Pt with each of the promoter of Sn or Co and the catalytic metal of Pt being in amounts substantially equivalent by moles to form a catalyst and promoter solution in which the promoter precursor and the catalytic metal precursor are dissolved such that the promoter precursor provides an active ion of either Sn$^{2+}$ or Co$^{2+}$ having an opposite charge of a charge of an active ion of the catalytic metal precursor comprising PtCl$_6^{2-}$, selecting a porous catalyst support with surfaces having adequate surface area;

adjusting the pH of the resulting catalyst and promoter solution;

immersing the catalyst support in the catalyst and promoter solution in which both the catalyst precursor and promoter precursor are dissolved, such that the porous catalyst support is impregnated with the catalytic metal and the catalyst support is in contact with the catalyst and promoter solution for impregnation;

removing the catalyst support from the catalyst and promoter solution;

drying the impregnated catalyst support under ambient conditions that prevents capillary effect transfer of the impregnating from an interior of the catalyst support to an exterior of the catalyst support with the catalytic metal being further dried at or above 100° C.;

performing a catalyst calcination step under elevated temperatures; and achieving a single atomic dispersion of the Pt of at least 90% with a 1.1 or greater wt % Pt loading.

2. The process according to claim 1 wherein the catalytic metal is further dried at or above 100° C.

3. The process according to claim 1 wherein the calcination step is done in the presence of at least one of air, hydrogen, inert gas, or combination thereof.

4. The process according to claim 3 wherein the calcination step is performed at a temperature between 450° and 700° C.

5. The process according to claim 1 wherein the catalytic metal occupies less than 0.5% of the catalyst surface area.

6. The process according to claim 1 wherein the catalyst support is porous, and its surface area is between about 385 m$^2$/g and about 1,475 m$^2$/g.

7. The process according to claim 1 wherein at least a portion of the catalytic metal forms an atomic structure on the catalyst support such that every atom of the catalytic metal is capable of interaction during catalytic activity to provide the single atomic dispersion of the catalytic metal and a value for the single atomic dispersion is determined using a hydrogen-oxygen titration dispersion calculation based on the ratio of the number of moles of adsorptive chemisorbed to the number of moles of the catalytic metal.

8. The process according to claim 1 wherein the platinum is present at between 1.1 to 1.5% weight loading and a dispersion value greater than 100% using a hydrogen-oxygen titration dispersion calculation based on the ratio of the number of moles of adsorptive chemisorbed to the number of moles of platinum in the catalytic metal.

9. The process according to claim 1, wherein the catalytic metal is cycled between about 500° C. and ambient without losing dispersion value determined using a hydrogen-oxygen titration dispersion calculation based on the ratio of the number of moles of adsorptive chemisorbed to the number of moles of the catalytic metal.

10. The process according to claim 1 wherein the catalyst support is selected from the group consisting of activated carbon, alumina, silica, silica-alumina, or molecular sieves.

* * * * *